L. H. KAUPKE.
CLUTCH MECHANISM.
APPLICATION FILED DEC. 24, 1918.
1,338,139.
Patented Apr. 27, 1920.
5 SHEETS—SHEET 2.
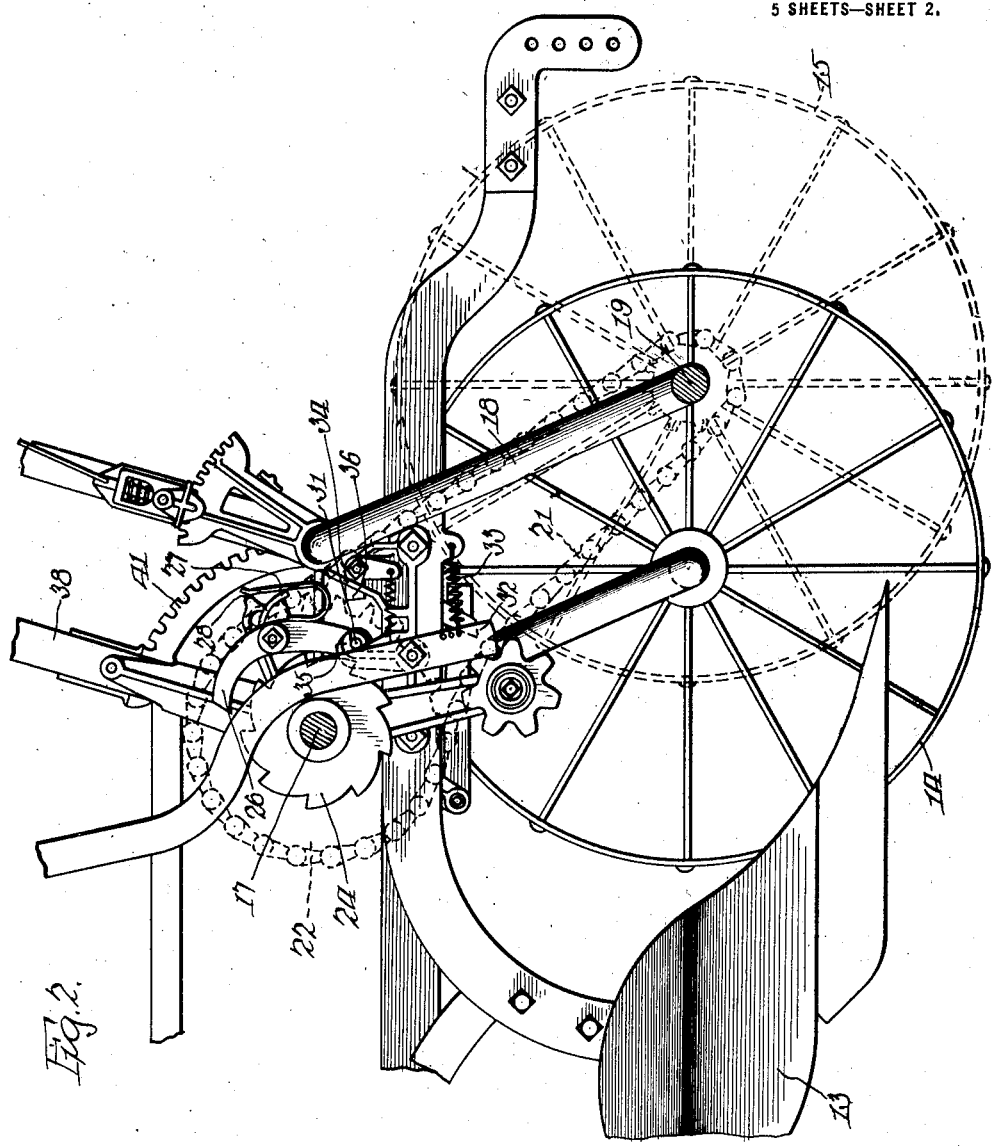

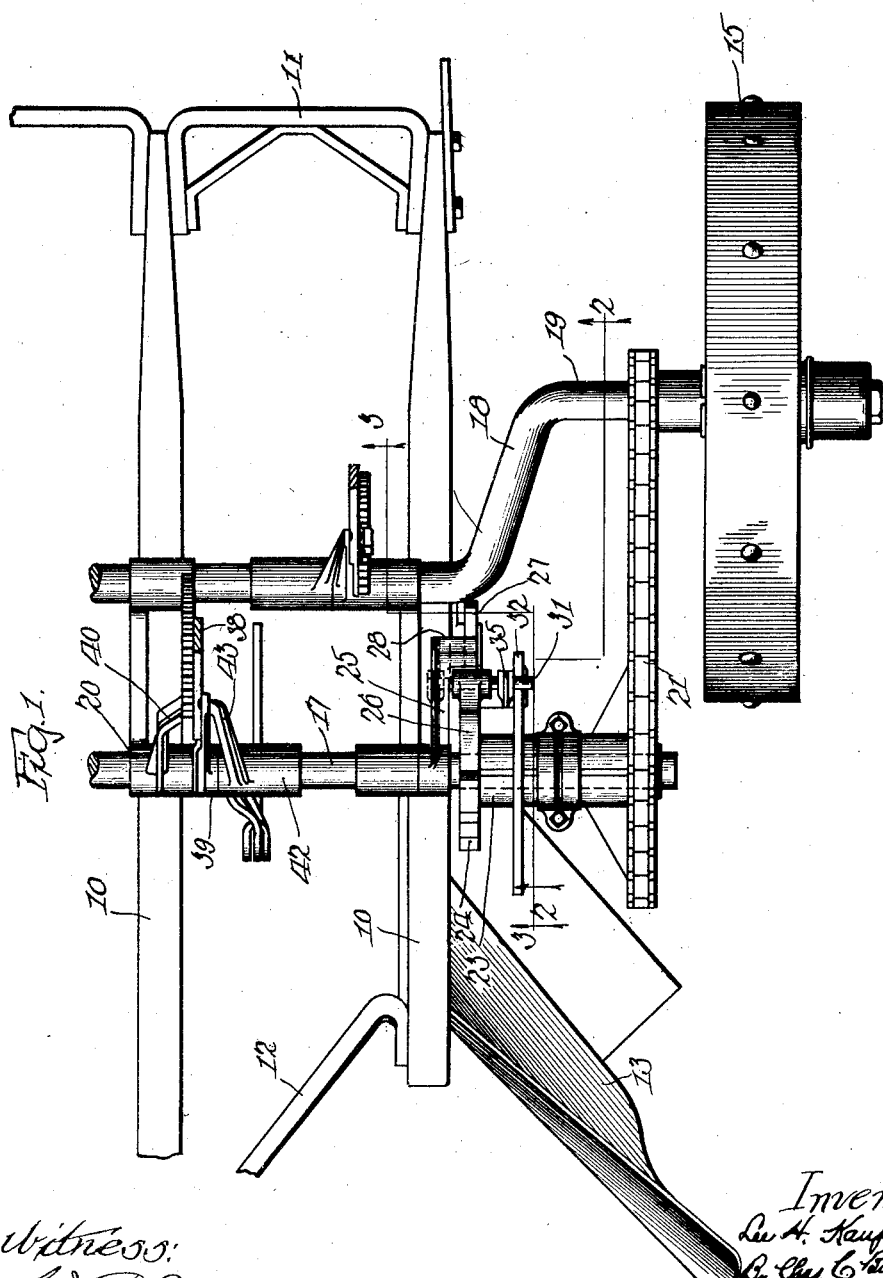

L. H. KAUPKE.
CLUTCH MECHANISM.
APPLICATION FILED DEC. 24, 1918.
1,338,139.
Patented Apr. 27, 1920.
5 SHEETS—SHEET 3.
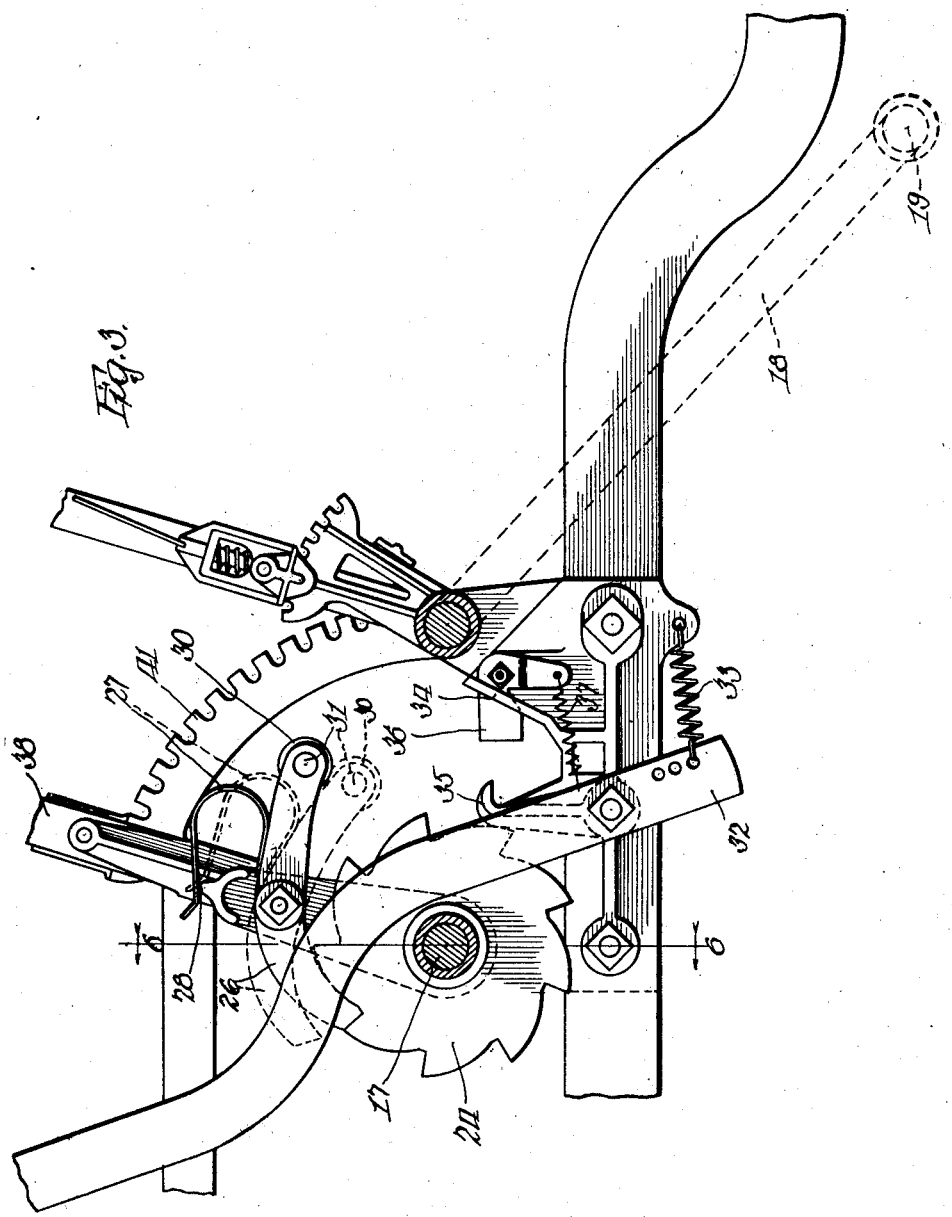
INVENTOR.
Lee H. Kaupke
BY Chas C Bulkley
ATTORNEYS.

L. H. KAUPKE.
CLUTCH MECHANISM.
APPLICATION FILED DEC. 24, 1918.
1,338,139.
Patented Apr. 27, 1920.
5 SHEETS—SHEET 4.
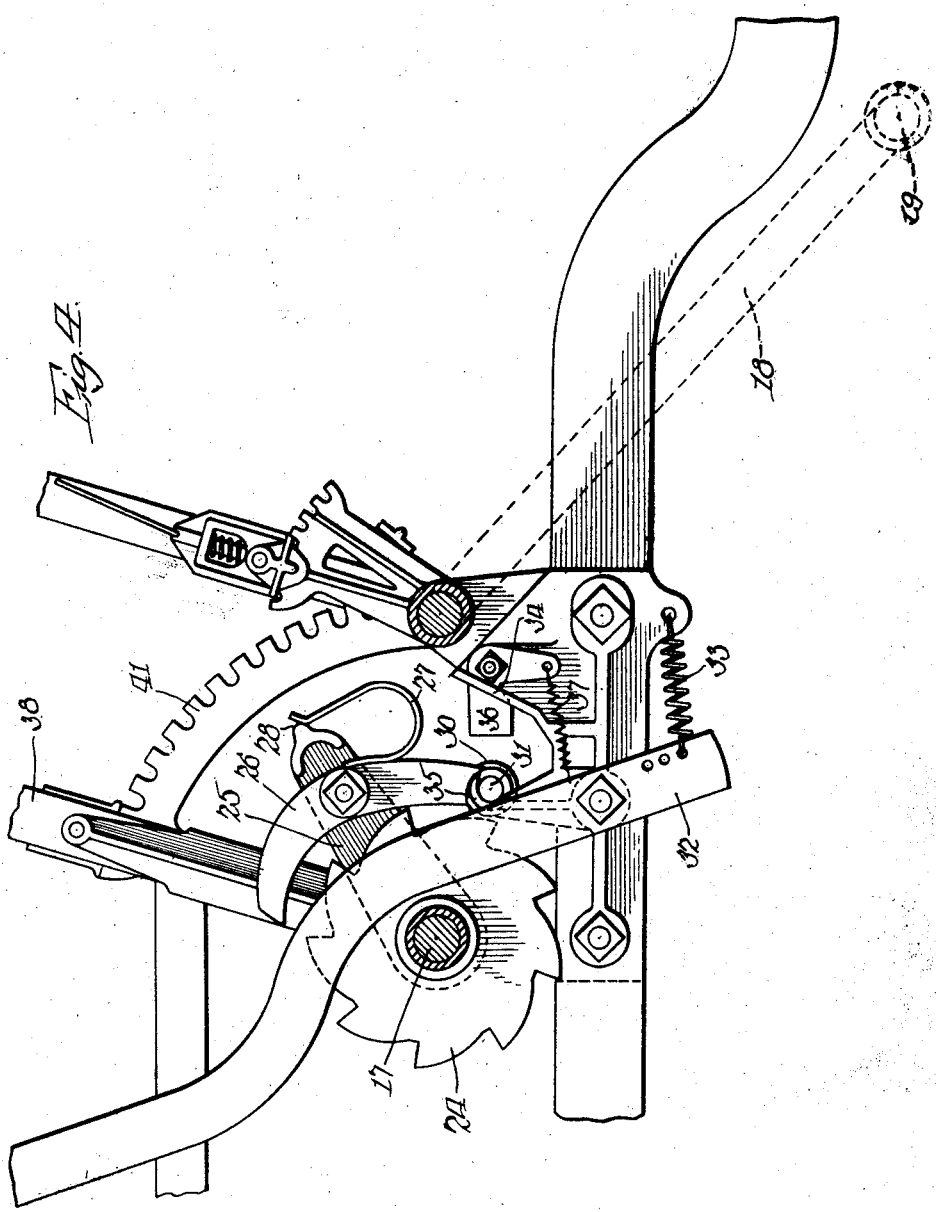
INVENTOR.
Lee H. Kaupke,
BY
ATTORNEYS.

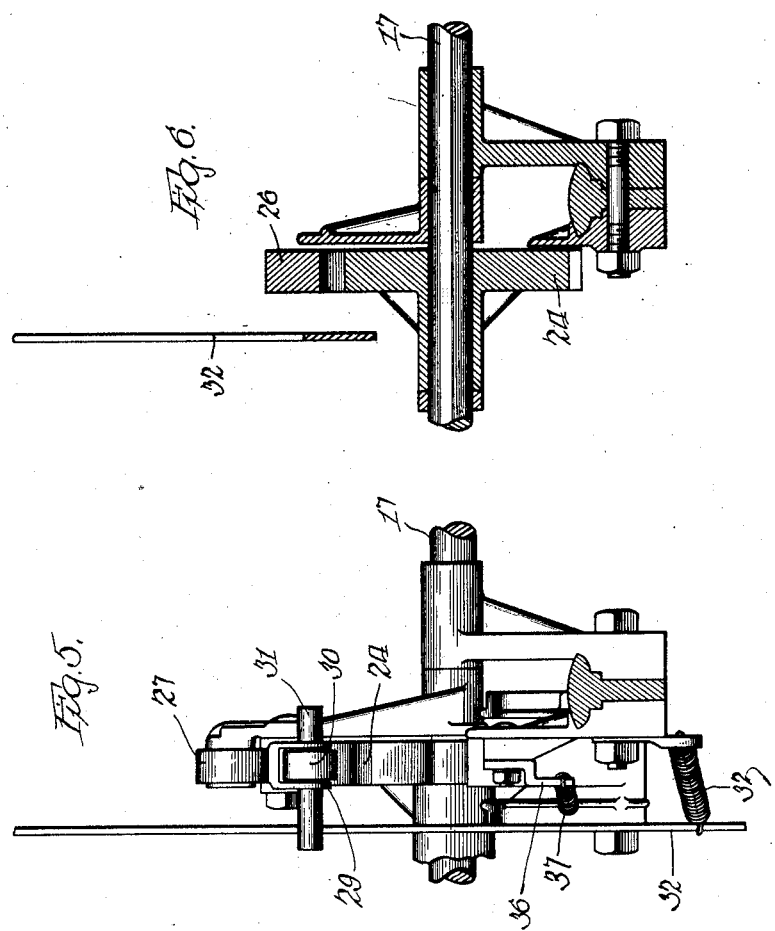

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

CLUTCH MECHANISM.

1,338,139.  Specification of Letters Patent.  Patented Apr. 27, 1920.

Original application filed April 20, 1916, Serial No. 92,343. Divided and this application filed December 24, 1918. Serial No. 268,160.

*To all whom it may concern:*

Be it known that I, LEE H. KAUPKE, a citizen of the United States of America, and resident of Rock Island, Rock Island county, Illinois, have invented a certain new and useful Improvement in Clutch Mechanism, of which the following is a specification.

My invention relates to an improvement in clutch mechanism, particularly to the type adapted for use in connection with agricultural implements such as tractor plows.

The objects of my invention are to provide a clutch which is simple and durable in construction, and effective and efficient in operation.

Further objects relate to the provision of a clutch in which the driven member can be readily thrown into engagement with the driving member, and is then automatically thrown out of engagement when the parts have reached a predetermined point.

This application is a division of my application Serial No. 92,343, filed April 20, 1916, for tractor plows, the present application being limited to the clutch mechanism which I have there shown adapted for use with my improved tractor plow. The various features and objects of my invention will be more readily understood by having reference to the accompanying drawings, in which I have illustrated one embodiment of my invention in combination with portions of the tractor plow mechanism.

Figure 1 is a plan view of my improved clutch showing portions of the tractor plow to which it is applied.

Fig. 2 is a sectional view taken on the line 2—2 of Fig. 1, looking in the direction of the arrows.

Fig. 3 is a detail sectional view taken on the line 3—3 of Fig. 2, looking in the direction of the arrows, showing the parts in the position they assume when the plows are in their lowered position.

Fig. 4 is a view similar to Fig. 3, but showing the parts in the position they assume when the plows have been raised.

Fig. 5 is a front elevation of the clutch mechanism, the plow beam being shown in cross section.

Fig. 6 is a central longitudinal section taken on the line 6—6 of Fig. 3.

I have illustrated my invention in connection with a tractor plow comprising a plurality of plow beams 10, secured together at their forward ends by the transverse braces 11 and near their rear ends by the diagonal brace 12. Suspended from these plow beams are the usual plow bottoms 13. The plow beams are supported by a landwheel 14 and a furrow-wheel 15, mounted upon independent axles. These axles are Z-shaped, being formed with horizontal portions or shafts 17 and forwardly and downwardly extending portions 18 and outwardly extending extensions 19 upon which the wheels are mounted. The horizontal shaft portions 17 are suitably journaled in bearings 20, mounted on the plow beams. The axles of both the land and furrow wheels are thus pivotally mounted on the plow-beams so that when they are swung downwardly and rearwardly they will effect the elevating or lifting of the plow-beams; and vice versa, when the axles are swung forwardly and upwardly about their pivots, the beams will be correspondingly lowered. The power for raising the beams in this manner is derived from the furrow-wheel 15 and is transmitted from this furrow-wheel to the shaft 17 of the land-wheel through the medium of the sprocket-chain 21 which drives the sprocket-wheel 22 loosely mounted upon this shaft. This sprocket is provided with an extended hub 23, upon which is mounted a toothed-ratchet 24, so that this toothed-ratchet is constantly driven during the operation of the plow by the power derived from the furrow-wheel. Mounted upon a suitable collar, keyed to the shaft 17, is an arm 25 upon which is pivoted a pawl 26. This pawl is normally held out of engagement with the teeth of the ratchet 24 by means of the spring 27, which engages with the rounded end portion 28 of the arm 25. The construction is such that when the pawl is in the position shown in Fig. 4, this spring tends to hold the pawl out of engagement with the ratchet teeth, but when the pawl has been thrown into engagement with the ratchet, as shown in Fig. 3, this spring bears upon the opposite side of the rounded end 28, and thus tends to yieldingly hold the pawl in engagement with the ratchet teeth. This pawl is provided with a tail-portion provided with a bifurcated end 29, as shown in Fig. 5, which forms bearings for a roller 30 mounted upon a pin 31, which pin extends laterally on each side of the roller 30, as shown in Figs. 1 and 5. Pivotally mounted upon the plow-beam is an operating lever 32 which is adapted to engage with the lateral extension of the pin 31, but is normally held out of engagement therewith by means of the spring 33. When the parts are in the position shown in dotted lines in Fig. 3, the operator by rocking this lever 32 about its pivot causes this lever to strike the pin 31, thus forcing the pawl against the spring pressure exerted by the spring 27 into engagement with the ratchet-teeth. By this movement of the pawl, the end of the spring 27 snaps over the end 28 of the arm 25, and thus operates to hold the pawl in engagement with the ratchet. The arm 25 is thus caused to rotate and continues to rotate, thus rotating the shaft 17, until the roller 30 strikes the cam-surface 34 mounted upon the plow-beam. The engagement by the roller 30 with this cam surface rocks the pawl so as to disengage the same from the ratchet 24, and at the same time throws the tail of the pawl into such a position that the lateral end portions of the pin 31 are engaged by the locking-hooks 35 mounted upon the plow-beam. These hooks thus operate to hold the parts in operated position after the pawl has been disengaged from the ratchet. When the parts are in this position, it will be readily understood that the axle 17 has been so rotated as to have the effect of elevating or lifting the plow-beams. When it is desired to lower the plows, the operator again pulls on the operating-lever 32, again causing this lever to strike the pin 31 so as to force this pin out of engagement with the locking-hooks 35. In order to prevent this operation of the hand-lever rocking the pawl 26 to such an extent as to throw the same again into engagement with the ratchet, I provide a stop 36 in the form of a bell-crank which is pivotally mounted to the plow-beam, a spring 37 being secured to the opposite arm of this bell-crank so that during the initial movement of the pawl 26 the roller 30 upon engaging the top surface of this bell-crank stop can rock the same downward and thus pass this stop; but when the pawl is forced out of engagement with the locking-hooks 35 the roller 30 strikes against the end-portion of this bell-crank which thus limits the movement of the pawl so as to prevent the same from being thrown into engagement with the ratchet teeth. The pawl 26 and the arm 25 being thus free to rotate, are then rotated back to normal position by reason of the weight of the plow bodies carried by the beams, this weight at all times tending to rotate the shaft 17 and thus the arm 25, in a counter-clockwise direction, as viewed in Figs. 2, 3 and 4. In order to limit this return or counter-clockwise movement of the arm 25, I provide a hand-lever 38 mounted upon a collar 39 loosely mounted upon the shaft 17. Rigidly mounted upon the plow-beam 10. there is an upstanding arm 40 which carries a rack 41, the hand-lever 38 being provided with a suitable spring-tooth for engaging the teeth in this rack, whereby this hand-lever can be held in any one of a plurality of adjusted positions. Keyed to the shaft 17, there is a second collar 42 which is provided with an upstanding arm 43, having its upper end turned laterally so as to be in the path of the operating-lever 38, and thus engaged thereby, when this lever is rotated in a clockwise direction, as shown in Figs. 2, 3 and 4. Thus when the clutch is operated and the shaft 17 rotated, as hereinbefore described, the arm 43 is moved away from the hand-lever 38 and moved independently thereof. When, however, the parts return to their normal position, this return movement is limited by reason of the engagement of the inturned end 44 of this arm 43 with the hand-lever 38. Thus by adjusting the hand-lever to its various positions, the extent of this return movement can be regulated, and thus the depth to which the plows are lowered into the ground readily controlled.

It will thus be seen that I have devised a very efficient form of clutch in which the throw of the arm is variable, depending upon the position of the hand-lever controlled-stop, but that the point of disengagement between the pawl and ratchet always occurs at a predetermined point—that is, the variation in travel or rotation of the arm on the shaft which carries the pawl is brought about by varying the point on the ratchet with which the pawl initially engages, while the point of disengagement remains constant. Furthermore, it will be seen that a single spring operates to hold the pawl in and out of engagement with the ratchet and a single operating lever is enabled to control both the engagement and disengagement of the pawl with the ratchet.

While I have illustrated one particular embodiment of my invention, and have shown same in connection with the tractor plow illustrated in my parent application hereinbefore referred to, it is, of course, understood that my invention is not so limited, but that the clutch may be applied to other uses and that various changes and modifications in the construction of the clutch may be suggested to those skilled in the art after having obtained a knowledge of my invention.

What I claim as my invention is:

1. In a clutch, a driving member consisting of a constantly driven ratchet, a driven member consisting of an arm carrying a pawl, means for forcing said pawl out of engagement with said ratchet at a predetermined point in the rotation of said arm, means independent of said driving member for returning said arm, and an adjustable hand-lever adjacent said arm for engaging said arm on its return movement to thereby regulate the extent of such return movement.

2. In a clutch, a shaft, a constantly driven ratchet loosely mounted thereon, an arm rigid with said shaft, a pawl pivoted upon said arm, means for throwing said pawl into engagement with said ratchet to thereby rotate said arm, a tail-portion for said pawl provided with a roller, a cam surface with which said roller is adapted to engage to thereby rock said pawl so as to disengage same from the ratchet, and locking means adapted to engage said pawl when so disengaged from said ratchet to hold said arm in operative position.

3. In a clutch, a shaft, a driving member consisting of a constantly driven ratchet loosely mounted thereon, an arm rigid with said shaft, a pawl pivoted upon said arm, means for throwing said pawl into engagement with said ratchet to thereby rotate said arm, a tail-portion for said pawl provided with a roller, a cam surface with which said roller is adapted to engage to thereby rock said pawl so as to disengage same from the ratchet, locking means adapted to engage said pawl when so disengaged from said ratchet to hold said arm in operative position, means for disengaging said pawl from said locking means, means independent of said driving member for returning said arm, and means for limiting the return movement of said arm.

4. In a clutch, a shaft, a driving member consisting of a constantly driven ratchet loosely mounted thereon, an arm rigid with said shaft, a pawl pivoted upon said arm, means for throwing said pawl into engagement with said ratchet to thereby rotate said arm, a tail-portion for said pawl provided with a roller, a cam surface with which said roller is adapted to engage to thereby rock said pawl so as to disengage same from the ratchet, locking means adapted to engage said pawl when so disengaged from said ratchet to hold said arm in operative position, means for disengaging said pawl from said locking means, means independent of said driving member for returning said arm, and means for limiting the movement of said arm, said last-mentioned means consisting of an adjustable hand-lever whereby the return movement of said arm may be controlled.

5. In a clutch, a constantly driven ratchet, an arm loosely mounted with respect to said ratchet, a pawl pivotally mounted upon said arm, a spring normally holding said pawl out of engagement with said ratchet, and means for forcing said pawl into engagement with said ratchet against said spring pressure, said spring then operating to hold said pawl in engagement with said ratchet.

6. In a clutch, a constantly driven ratchet, an arm loosely mounted with respect to said ratchet, a pawl pivotally mounted upon said arm, a spring normally holding said pawl out of engagement with said ratchet, means for forcing said pawl into engagement with said ratchet against said spring pressure, said spring then operating to hold said pawl in engagement with said ratchet, a cam surface adapted to be engaged by said pawl for forcing said pawl out of engagement with said ratchet, and locking means for engaging said pawl for holding said pawl in inoperative position.

7. In a clutch, a constantly driven ratchet, an arm loosely mounted with respect to said ratchet, a pawl pivotally mounted upon said arm, a spring normally holding said arm out of engagement with said ratchet, means for forcing said pawl into engagement with said ratchet against said spring pressure, said spring then operating to hold said pawl in engagement with said ratchet, a cam surface adapted to be engaged by said pawl for forcing said pawl out of engagement with said ratchet, locking means for engaging said pawl for holding said pawl in inoperative position, means for forcing said pawl out of engagement with said locking means, and a stop for limiting the movement of said pawl when so released to prevent the same from being again forced into engagement with said ratchet.

8. In a clutch, a constantly driven ratchet, an arm loosely mounted with respect to said ratchet, a pawl pivotally mounted upon said arm, a spring normally holding said arm out of engagement with said ratchet, means for forcing said pawl into engagement with said ratchet against said spring pressure, said spring then operating to hold said pawl in engagement with said ratchet, a cam surface adapted to be engaged by said pawl, for forcing said pawl out of engagement with said ratchet, locking means for engaging said pawl for holding said pawl in inoperative position, means for forcing said pawl out of engagement with said locking means, a stop for limiting the movement of said pawl when so released to prevent the same from being again forced into engagement with said ratchet, said stop consisting of a spring-controlled bell crank adapted to be forced out of the path of said pawl during the initial movement of said pawl, but being adapted to engage said extension when the pawl is released from said locking means to limit the movement thereof.

9. In a clutch, a constantly driven ratchet, an arm carrying a pawl adapted to be thrown into engagement with said ratchet, means for disengaging said pawl from said ratchet, means for holding said pawl in inoperated position, means for forcing said pawl out of engagement with said holding means, and a stop for limiting the movement of said pawl when so released to prevent the same from being again forced into engagement with said ratchet.

10. In a clutch, a constantly driven ratchet, an arm carrying a pawl adapted to be thrown into engagement with said ratchet, means for disengaging said pawl from said ratchet, means for holding said pawl in inoperated position, means for forcing said pawl out of engagement with said holding means, a stop for limiting the movement of said pawl when so released to prevent the same from being again forced into engagement with said ratchet, said stop consisting of a spring-controlled bell crank adapted to be forced out of the path of said pawl during the initial movement of said pawl, but being adapted to engage said extension when the pawl is released from said locking means to limit the movement thereof.

11. In a clutch, a rotating ratchet, an arm carrying a pawl, unitary means for throwing said pawl into engagement with said ratchet upon one operation thereof to thereby rotate said pawl, means for disengaging said pawl from said ratchet, means for holding said pawl in its advanced disengaged position, and means controlled by a subsequent operation of said unitary means for releasing said pawl from said holding means.

Signed by me at Rock Island, Illinois, this 26 day of October, 1918.

LEE H. KAUPKE.